United States Patent [19]
Urban et al.

[11] Patent Number: 5,746,820
[45] Date of Patent: May 5, 1998

[54] SURFACE-TREATED QUINACRIDONE AND DIOXAZINE PIGMENTS

[75] Inventors: Manfred Urban, Wiesbaden; Dieter Schnaitmann, Eppstein, both of Germany

[73] Assignee: Hoechst Aktiengesellschaft, Frankfurt, Germany

[21] Appl. No.: 837,720

[22] Filed: Apr. 22, 1997

[30] Foreign Application Priority Data

Apr. 24, 1996 [DE] Germany .................. 196 16 364.1

[51] Int. Cl.⁶ .................. C09C 1/02; C08K 5/00; C08K 5/34; C09B 48/00
[52] U.S. Cl. .................. 106/471; 106/493; 106/495; 106/497; 523/200; 524/90; 524/719; 524/720
[58] Field of Search .................. 106/471, 497, 106/493, 494, 495, 498, 31.75, 31.77; 544/74, 77; 546/49; 523/200; 524/90, 719, 720

[56] References Cited

U.S. PATENT DOCUMENTS

| | | | |
|---|---|---|---|
| 3,865,605 | 2/1975 | Spietschka et al. | 106/288 Q |
| 4,253,839 | 3/1981 | Spietschka et al. | 8/565 |
| 4,496,731 | 1/1985 | Spietschka et al. | 546/37 |
| 4,617,403 | 10/1986 | Spietschka et al. | 549/56 |
| 5,662,739 | 9/1997 | Urban | 106/497 |

FOREIGN PATENT DOCUMENTS

| | | |
|---|---|---|
| 0088392 | 9/1983 | European Pat. Off. . |
| 0662497 | 7/1995 | European Pat. Off. . |
| 1150046 | 12/1963 | Germany . |
| 2152485 | 5/1975 | Germany . |
| 2742575 | 2/1979 | Germany . |

OTHER PUBLICATIONS

Kats MD, Pushkina LL, Moroz VA, Slavutskaya LM, Tikhonov VI. Khim. Prom-St. (Moscow), 7, pp. 401–402, 1981.

*Primary Examiner*—C. Warren Ivy
*Assistant Examiner*—Evelyn Huang
*Attorney, Agent, or Firm*—Connolly & Hutz

[57] ABSTRACT

The use of sulfuric monoesters of the formulae (I) and (II)

$$R^1-O-(CH_2O)_n-SO_3^-M^+ \quad (I)$$

$$R^1-CO-NR^2-(CH_2O)_{n+1}-SO_3^-M^+ \quad (II)$$

in which $R^1$ is a straight-chain or branched alkyl group of 10 to 24 carbon atoms, $R^2$ is a hydrogen atom or a $C_1$–$C_6$-alkyl group, $M^+$ is a hydrogen ion, an alkali metal ion, ½ an alkaline earth metal ion, or an ammonium ion of the formula $N^+R^3R^4R^5R^6$, where the substituents $R^3$, $R^4$, $R^5$ and $R^6$ independently of one another are each hydrogen atoms or $C_1$–$C_6$-alkyl groups, which alkyl groups can be substituted by 1 to 3 hydroxyl groups, and n is a number from 0 to 4; or of a mixture of at least two sulfuric monoesters of the formulae (I) and/or (II), for preparing surface-treated pigments from the classes of the quinacridones and dioxazines.

19 Claims, No Drawings

SURFACE-TREATED QUINACRIDONE AND DIOXAZINE PIGMENTS

The present invention relates to surface-treated pigments based on quinacridone and dioxazine pigments, and to their use in aqueous and nonaqueous systems.

When incorporating pigments into materials of high molecular mass there is often the problem that dispersion is incomplete in some application media and the optimum color strength is not achieved, or that difficulties occur in connection with the processing of the pigmented systems. In order to facilitate the incorporation of pigments into the application media the pigments are in most cases treated with surface-active agents (surfactants). These surfactants coat the surface of the pigment in such a way that, during the drying and milling of the pigments, agglomeration is largely prevented, giving pigments which, even after prolonged storage, are serviceable, with ready dispersibility, a high color strength and good rheological properties. This places stringent requirements on the surfactants, especially if the pigments are employed in aqueous and nonaqueous systems. Certain surface-treated pigments, for instance, after having been incorporated into an offset printing varnish, show severe scumming in the course of offset printing, so that the use of these pigments in this important printing process is no longer possible. Scumming is understood as being inking which occurs at those areas of the substrate material that it is not intended should be inked. To this end the nonprinting areas are wetted continually with a damping roller so that the printing ink is not transferred to these areas. The compounds responsible for transferring the printing ink to the wetted areas are the surfactants present in the pigments, whose wetting effect increases the affinity of the printing ink for water to such an extent that transfer to the wetted areas is made possible.

It is known that pigments can be treated with surfactants in order to improve their performance properties. To achieve this the pigments are treated, in accordance with U.S. Pat. No. 3,865,605, with an alkaline solution of an alkylarylsulfonate or alkylphenol polyglycol ether sulfate before being acidified and isolated. The resulting pigments are suitable only for pigmenting lacquers and paints, so that their use is severely restricted. Over and above this, the use of surfactants based on phenolic compounds is no longer ecologically acceptable for some fields of use.

A range of surfactants, including fatty alcohol polyglycol ether sulfates, have been proposed as additives for enhancing the performance properties of perylene pigments. The use of the perylene pigments obtained, however, is limited to the paints sector. U.S. Pat. No. 4,496,731 describes the preparation of perylenetetracarboxylic N,N'-dimethylimide pigments. In the preparation of these pigments, the surfactants employed are preferably resin soaps and quaternary ammonium salts. This produces transparent pigments which are employed preferentially in metallic coating materials. When fatty alcohol polyglycol ether sulfates are used, however, opaque pigments are obtained which are unsuitable for use in metallic coating materials.

According to U.S. Pat. No. 4,617,403 it is proposed, in order to improve the performance properties of tetrachlorothioindigo pigments, to use a range of surfactants, including fatty alcohol polyglycol ether sulfates. Resin soaps are preferably employed. The use of the resulting tetrachlorothioindigo pigments is limited, however, to the paints and plastics sectors.

EP-A 0 662 497 describes how the addition of surfactants from the series of the fatty acid taurides gives pigments which can be employed in all common systems. These pigments too do not meet every requirement, since they exhibit severe scumming in offset printing. As a result, there are very great restrictions on their universal use.

In the case of quinacridone and dioxazine pigments, the addition of surfactants has so far produced pigments suitable only for particular fields of use. The use of a single surfactant for different fields of use has to date been unsuccessful. There was a need to prepare readily dispersible, toxicologically acceptable, surface-treated pigments of this kind which are readily dispersible, flocculation-stable and compatible in all common fields of use.

It has been found that this objective can surprisingly be achieved by the use of one or more surfactants from the series of the sulfuric monoesters.

The present invention provides for the use of sulfuric monoesters of the formulae (I) and (II)

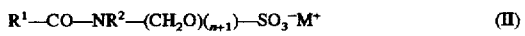

in which $R^1$ is a straight-chain or branched alkyl group of 10 to 24 carbon atoms, preferably 10 to 16 carbon atoms, $R^2$ is a hydrogen atom or a $C_1$–$C_6$-alkyl group.

$M^+$ is a hydrogen ion, an alkali metal ion, ½ an alkaline earth metal ion, or an ammonium ion of the formula $N^+R^3R^4R^5R^6$, where the substituents $R^3$, $R^4$, $R^5$ and $R^6$ independently of one another are each hydrogen atoms or $C_1$–$C_6$-alkyl groups, which alkyl groups can be substituted by 1 to 3 hydroxyl groups, and n is a number from 0 to 4, preferably from 2 to 3;

or of a mixture of at least two sulfuric monoesters of the formulae (I) and/or (II), for preparing surface-treated pigments from the classes of the quinacridones and dioxazines.

Sulfuric monoesters of particular interest for the novel use are those whose fatty acid residue $R^1$ has 12 to 14 carbon atoms, and a mixture of such sulfuric monoesters.

Examples of pigments from the class of the dioxazines that are surface-coated in accordance with the invention are C.I. Pigment Violet 23 (C.I. No. 51 319) of the formula III

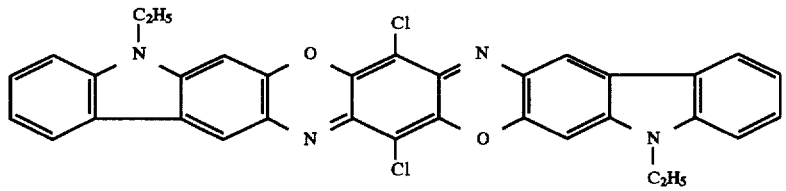

and C.I. Pigment Violet 37 (C.I. No. 51 345) of the formula IV

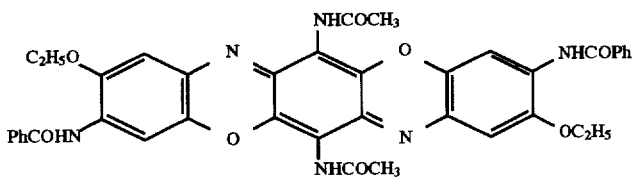

(IV)

in which Ph is phenyl.

Examples of pigments from the class of the quinacridones that are surface-coated in accordance with the invention are C.I. Pigment Violet 19 (C.I. No. 46 500) of the formula V

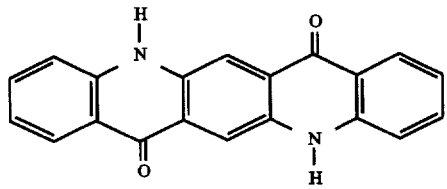

(V)

which can be in the β-phase or the γ-phase, and also 2,9-dimethylquinacridone, 1,8-dichloroquinacridone, 2,9-dichloroquinacridone, 3,10-dichloroquinacridone and 2,9-di-N-methylcarboxamidoquinacridone.

The application of the sulfuric monoesters to the surface of the pigment particles can be made at various stages in the process of pigment preparation.

In the case of dioxazine pigments the pigment preparation process must ensure the conversion to the pigment form of the crude pigments that are obtained as coarse crystals during synthesis in organic aromatic solvents. In accordance with BIOS Final Report 960, page 75, this is achieved by a process of fine division and a subsequent finishing operation. Processes of fine division are, for example, wet and dry milling operations, dissolution or suspension in concentrated acids followed by discharge into water. Examples of finish processes are the aftertreatment of the finely divided crude pigments, referred to as prepigments, with water, organic solvents, acids or alkalis, with or without the addition of surfactants and with or without the addition of pigment-dispersing agents (pigment dispersants) and/or temperature treatment.

In the preparation of quinacridone pigments the fine division can be achieved directly during the synthesis, in accordance with DE-A-1 150 046. The finely divided prepigments which are present after the fine division are still not suitable for direct use but must be subjected, in addition, to a finish treatment.

The sulfuric monoesters of the formula (I) and/or (II) can be added before, during or after the finish operation. It is also possible to add the sulfuric monoesters even during fine division, or not until the stage of the isolated, moist pigment. The sulfuric monoesters are preferably added directly before or after the finish operation.

A preferred procedure comprises the initial introduction of—based on the prepigment—from one to three times the amount of solvent, which is then acidified by adding acid to a pH between 2 and 5, preferably using formic acid, acetic acid or propionic acid. Suitable solvents that are used for the finish are those listed below. The sulfuric monoester, preferably in the form of a salt, is introduced into this mixture and dissolved. Subsequently a prepigment as obtained, for example, in accordance with the information in U.S. Pat. No. 4,253,839 is introduced and stirred in. Following addition of from 5 to 10 times the amount by weight of water, the mixture is stirred at temperatures from 50° to 150° C. for 1 to 5 hours. The solvent is subsequently distilled off and the pigment is isolated in the conventional manner.

It is also possible to add the sulfuric monoesters in solid form or as an aqueous or aqueous-alkaline solution to the already finished pigment.

Another possible procedure comprises adding an aqueous or aqueous-alkaline solution of a sulfuric monoester to the aqueous pigment suspensions that are present after the finish and after the removal of the solvent, and then aftertreating the mixture at temperatures from 50° to 100° C. The pigment is subsequently isolated in a conventional manner, directly or following adjustment to a pH of from 5 to 7.

Examples of suitable solvents for the finish are alicyclic hydrocarbons, such as cyclohexane; $C_1$–$C_8$-alkanols and alicyclic alcohols, such as methanol, ethanol, n- or isopropanol, n- or isobutanol, tert-butanol, pentanols, hexanols, cyclohexanol; $C_1$–$C_5$-dialkyl ketones or cyclic ketones, such as acetone, diethyl ketone, methyl isobutyl ketone, methyl ethyl ketone or cyclohexanone; ethers and glycol ethers, such as the monomethyl or monoethyl ether of ethylene glycol or propylene glycol, or butylglycol, ethyldiglycol or methoxybutanol; aromatic hydrocarbons, such as toluene, xylenes or ethylbenzene, cyclic ethers, such as tetrahydrofuran, aromatic chlorinated hydrocarbons, such as chlorobenzene, o-dichlorobenzene, 1,2,4-trichlorobenzene or bromobenzene; substituted aromatic compounds, such as benzoic acid, nitrobenzene or phenol; aliphatic carboxamides, such as formamide or dimethylformamide; cyclic carboxamides, such as N-methylpyrrolidone; $C_1$–$C_4$-alkyl carboxylates, such as butyl formate, ethyl acetate or propyl propionate; $C_1$–$C_4$-glycol carboxylates, $C_1$–$C_4$-alkyl phthalates and benzoates, such as ethyl benzoates; heterocyclic bases such as pyridine, morpholine or picoline; and also dimethyl sulfoxide and sulfolane.

Preferred organic solvents are alkanols, especially ethanol, propanols, butanols and pentanols; aliphatic carboxamides, such as formamide or dimethylformamide; cyclic carboxamides, especially N-methylpyrrolidone; $C_1$–$C_5$-dialkyl ketones or cyclic ketones, especially acetone, diethyl ketone, methyl isobutyl ketone, methyl ethyl ketone or cyclohexanone.

The sulfuric monoesters are expediently added in an amount of from 0.1 to 5% by weight, preferably from 0.5 to 2.5% by weight, based on dry pigment. This produces pigment preparations wherein the surface of the pigment particles is coated completely or partially with said sulfuric monoester.

In addition to the sulfuric monoesters, other pigment dispersants can also be added.

Appropriate pigment dispersants which can be employed in combination with the sulfuric monoesters are preferably those of the formula (VI)

$$P\text{---}[X]_m \qquad (VI)$$

in which

P is an m-valent radical of a pigment based on a quinacridone or dioxazine, preferably C.I. Pigment Violet 19 in the case of a quinacridone and preferably C.I. Pigment Violet 23 in the case of a dioxazine, m is a number from 1 to 4, and X is a group of the formula (VII)

in which A is a five- or six-membered aromatic heterocycle that may, if desired, be fused on, and which contains 1 to 3 identical or different heteroatoms from the series consisting of nitrogen, oxygen and/or sulfur, preferably imidazolyl or indolyl, and the heterocycle is attached to the methylene group via a carbon atom, $R^7$ and $R^8$ are a hydrogen atom or a $C_1$–$C_4$-alkyl, a $C_2$–$C_4$-alkenyl or an aryl group, preferably phenyl group, and $R^7$ and R8 together may also form an aliphatic or aromatic ring, and $R^9$ is a hydrogen atom or a $C_1$–$C_4$-alkyl, a $C_1$–$C_3$-hydroxyalkyl or a $C_2$–$C_4$-alkenyl group, or in which X is a group of the formula (VIII)

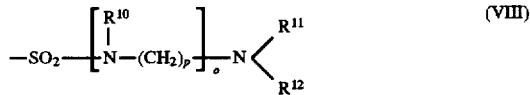

in which $R^{11}$ and $R^{12}$ independently of one another are each a hydrogen atom, a $C_1$–$C_{20}$-alkyl, $C_2$–$C_{20}$-alkenyl group or a $C_5$–$C_7$-cycloalkyl group, or in which $R^{11}$ and $R^{12}$, together with the adjacent nitrogen atom, form an aliphatic or aromatic, five- or six-membered heterocyclic system having in each case from 1 to 3 identical or different heteroatoms which belong to the ring and are from the series consisting of nitrogen, oxygen and/or sulfur, the system being preferably morpholinyl or pyrrolidinyl, $R^{10}$ is a hydrogen atom or a $C_1$–$C_4$-alkyl group, p is a number from 1 to 6 and o is 1 or 2.

The pigment dispersants mentioned are expediently added in an amount of from 0 to 10% by weight, preferably from 0.5 to 5% by weight, based on the basic pigment. The addition of the pigment dispersants can be made during the fine division, before, during or after the finish, or to the isolated, moist pigment.

The present invention additionally provides a pigment preparation consisting essentially of a) a pigment from the class of quinacridones or dioxazines, b) one or more sulfuric monoesters of the formulae (I) and/or (II), and c) if desired, a pigment dispersant of the formula (VI).

Preference is given to a pigment preparation consisting essentially of a) from 90 to 99.9% by weight, preferably from 99.5 to 90% by weight, of a pigment from the class of quinacridones or dioxazines, b) from 0.1 to 5% by weight, preferably from 0.5 to 2.5% by weight, of one or more sulfuric monoesters of the formulae (I) and/or (II), and c) from 0 to 9.9% by weight, preferably from 0.5 to 5% by weight, of a pigment dispersant of the formula (VI).

Particular preference is given to pigment preparations as mentioned above comprising, as pigment, C.I. Pigment Violet 23, C.I. Pigment Violet 37, C.I. Pigment Violet 19, 2,9-dimethylquinacridone, 1,8-dichloroquinacridone, 2,9-dichloroquinacridone, 3,10-dichloroquinacridone or 2,9-di-N-methylcarboxamidoquinacridone. Very particular preference is given to C.I. Pigment Violet 19 und C.I. Pigment Violet 23.

The present invention provides, furthermore, a process for preparing a pigment preparation, which comprises adding one or more sulfuric monoesters of the formula (I) and/or (II) in an amount of from 0.1 to 5% by weight, based on dry pigment, and from 0 to 9.9% by weight of a pigment dispersant of the formula (VI).

Through the addition of the sulfuric monoesters, the novel surface-treated pigments are markedly superior to the untreated pigments in their coloristic and rheological properties. It was surprising and unforeseeable that with the pigments obtained by addition of sulfuric monoesters, compared to the pigments prepared using fatty acid taurides, no scumming occurs in offset printing despite the fact that the wetting effect of the sulfuric monoesters is markedly greater than that of the fatty acid taurides. This substantially widens the scope for application of these pigments, and makes it unnecessary to develop a plurality of pigment types of the same basic pigment for a variety of fields of use.

The preparation of quinacridone and dioxazine pigment by the novel process has proven particularly economic and environmentally friendly. The surface-treated pigments can be prepared in a simple manner directly in the course of pigment preparation, by adding small amounts of the sulfuric monoesters in the course of fine division or at the finish stage, so that an additional process step is unnecessary. In the course of normal use, the sulfuric monoesters remain quantitatively on the pigment. Consequently, only very small amounts pass into the wastewater. Owing to their ready degradability, these small amounts are completely removed by biological wastewater treatment. Furthermore, only small amounts of chemicals and solvents are employed, which can be reprocessed or completely regenerated again afterwards. There are therefore no disposal problems. The costs of storage, provision of different apparatus, and for selling are kept low.

The surface-treated pigments prepared in accordance with the present invention are notable for their outstanding coloristic and rheological properties and for their ready dispersibility and good gloss characteristics when applied in a variety of media in the paints, printing and plastics sectors and in textile printing.

The surface-treated pigments prepared in accordance with the invention can be employed for pigmenting high molecular mass organic materials of natural or synthetic origin.

Examples of high molecular mass organic materials which can be pigmented using the abovementioned surface-treated pigments are cellulose ethers and cellulose esters, such as ethylcellulose, nitrocellulose, cellulose acetate or cellulose butyrate, natural resins or synthetic resins, such as addition polymerization resins or condensation resins, for example amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, caseine, silicone and silicone resins, individually or in mixtures. In this context it is irrelevant whether the abovementioned high molecular mass organic compounds are in the form of plastic masses or melts or in the form of spinning solutions, toners, lacquers, coating materials or printing inks. Depending on the intended use it proves advantageous to use the pigments that have been obtained in accordance with the invention as toners or in the form of preparations or dispersions. Based on the high molecular mass organic material that is to be pigmented, the novel surface-treated pigments or pigment preparations are employed in an amount of preferably from 0.1 to 10% by weight.

The novel surface-treated pigments are particularly suitable for use in conventional lacquer systems from the class of the alkyd melamine resin lacquers and two-component (two-pack) lacquers based on polyisocyanate-crosslinkable alkyd and acrylic resins, and also in new, aqueous coating materials and in low-solvent, high-solids coating materials (i.e. with a high solids content).

The surface-treated pigments prepared in accordance with the invention are readily and very finely dispersible in many application media. They can be used to produce coatings, prints and mass colorations of high color strength, high gloss and high transparency with excellent fastness properties.

In order to evaluate the properties in the paints sector of the surface-treated pigments prepared in accordance with the invention, the following were selected from the large number of known lacquers: an alkyd-melamine resin lacquer (AM) containing aromatic components and based on a medium-oil alkyd resin and a butanol-etherified melamine resin; a polyester lacquer (PE) based on cellulose acetobutyrate and a melamine resin; and an aqueous lacquer based on polyurethane (PU).

In order to evaluate the properties in the plastics sector of the pigment preparations produced in accordance with the invention, plasticized polyvinyl chloride (PVC) was selected from the large number of known plastics.

In order to evaluate the properties in the printing sector of the pigment preparations produced in accordance with the invention, a selection was made from the large number of known printing systems of an intaglio printing system based on nitrocellulose (NC) and an offset printing system (OF) based on alkyd resin. The color strength and shade of color were determined in accordance with DIN 55986. The rheology of the millbase after dispersion was assessed using the following five-step scale:

5 highly fluid 4 fluid 3 viscous 2 slightly set 1 set

Following dilution of the millbase to the final pigment concentration, the viscosity was determined using the Rossmann "Viscospatula", type 301, from Erichsen.

Gloss measurements were carried out on castings of the coating materials onto sheets, at an angle of 20° in accordance with DIN 67530 (ASTM D 523) using the "multigloss" glossimeter from Byk-Mallinckrodt, Wesel.

The wetting values (NW) of the surfactants used were determined in accordance with DIN 53901. The wetting value is indicated in seconds. The wetting effect is greater the lower the NW.

In the preceding text and in the Examples which follow, parts and percentages are in each case by weight.

EXAMPLE 1

900 parts of isobutanol (85%) are charged to a stirred vessel, and 30 parts of formic acid (98% strength) are added. 6.4 parts of an aqueous paste of the sodium salt of a sulfuric monoester (active substance content 70%) of the formula (I) are added to this mixture and dissolved. In this formula (I) $R^1$ is a synthetic alkyl radical of 12 to 14 carbon atoms, n is 3 and $M^+$ is a sodium ion (NW 75 s). Then 600 parts of the prepigment of C.I. Pigment Violet 23, prepared in accordance with DE-A-2 742 575, Example 2 or U.S. Pat. No. 4,253,839 Example 2, containing 25% of synthesis salt, predominantly sodium chloride, are introduced, and the mixture is stirred at from 20° to 25° C. for 20 hours. During this period a further 600 parts of isobutanol (85%) are added. Then 3600 parts of water are added, the mixture is heated at boiling for 5 hours, and the isobutanol is distilled off azeotropically by heating to 100° C. at the bridge. After cooling to 60° C., the pigment is filtered off with suction, washed with water until neutral and free of salt, and dried at 80° C.

439.7 parts are obtained of a pigment preparation which gives transparent coatings of high color strength in the AM lacquer. The rheology is assessed as 4 to 5. The viscosity is 5.5 s and the gloss measurement results in a value of 84. Transparent coatings of high color strength are obtained in the PE lacquer. The viscosity is 2.3 s and the gloss measurement results in a value of 35. In the PU lacquer, transparent coatings of high color strength are obtained. The viscosity is 7.9 s.

In the NC print, transparent prints of high color strength and high gloss are obtained. In offset printing, prints of high transparency and high color strength are obtained. The flowability of the printing ink is very good, and the viscosity is low. No scumming occurs in the course of printing.

If the experiment is repeated but replacing the sulfuric monoester by 1% of a fatty acid tauride mixture (NW 175) according to EP-PA 0 662 497, then severe scumming occurs in the course of offset printing.

EXAMPLE 2

900 parts of isobutanol (85%) are charged to a stirred vessel, and 30 parts of formic acid (98% strength) are added. 11.25 parts of an aqueous paste of the ammonium salt of a sulfuric monoester (active substance content 40%) of the formula (II) are added to this mixture and dissolved. In this formula (II) $R^1$ is an alkyl radical based on a natural coconut fatty acid of 12 to 14 carbon atoms, $R^2$ is a hydrogen atom, n is 0.6 and $M^+$ is an ammonium ion in which $R^3$ is a hydrogen atom and $R^4$, $R^5$ and $R^6$ are each a hydroxyethyl group (NW 104 s). Then 600 parts of the prepigment of C.I. Pigment Violet 23, prepared in accordance with DE-A-2 742 575, Example 2 or U.S. Pat. No. 4,253,839 Example 2, containing 25% of synthesis salt, predominantly sodium chloride, are introduced, and the mixture is stirred at from 20° to 25° C. for 20 hours. During this period a further 600 parts of isobutanol (85%) are added. Then 3600 parts of water are added, the mixture is heated at boiling for 5 hours, and the isobutanol is distilled off azeotropically by heating to 100° C. at the bridge. After cooling to 60° C., the pigment is filtered off with suction, washed with water until neutral and free of salt, and dried at 80° C.

438.2 parts are obtained of a pigment preparation which gives transparent coatings of high color strength in the AM lacquer. The rheology is assessed as 4. The viscosity is 5.3 s and the gloss measurement results in a value of 85. Transparent coatings of high color strength are obtained in the PE lacquer. The viscosity is 2.0 s and the gloss measurement results in a value of 33. In the PU lacquer, transparent coatings of high color strength are obtained. The viscosity is 8.5 s. In the NC print, transparent prints of high color strength and high gloss are obtained. In offset printing, prints of high transparency and high color strength are obtained. The flowability of the printing ink is very good, and the viscosity is low. No scumming occurs in the course of printing.

If a pigment is prepared as in Example 2 but without the addition of the sulfuric monoester, then this pigment is markedly inferior coloristically to the surface-treated pigment.

EXAMPLE 3

225 parts of isobutanol (85%) are charged to a stirred vessel, and 7.5 parts of formic acid (98% strength) are added. 1.88 parts of an aqueous paste of the sodium salt of a sulfuric monoester (active substance content 60%) of the formula (I) are added to this mixture and dissolved. In this formula (I) $R^1$ is an alkyl radical based on a natural fatty acid of 12 to 14 carbon atoms, n is 2 and $M^+$ is a sodium ion (NW 55 s).

Then 150 parts of the prepigment of C.I. Pigment Violet 23, prepared in accordance with DE-A-2 742 575, Example 2 or U.S. Pat. No. 4,253,839 Example 2, containing 25% of synthesis salt, predominantly sodium chloride, are introduced, and the mixture is stirred at from 20° to 25° C. for 20 hours. During this period a further 150 parts of isobutanol (85%) are added. Then 900 parts of water are added, the mixture is heated at boiling for 5 hours, and the isobutanol is distilled off azeotropically by heating to 100° C. at the bridge. After cooling to 60° C., the pigment is filtered off with suction, washed with water until neutral and free of salt, and dried at 80° C. 110.5 parts are obtained of a pigment preparation which gives transparent coatings of high color strength in the AM lacquer. In nitrocellulose intaglio printing and in offset printing, glossy prints of high color strength are obtained.

EXAMPLE 4

225 parts of isobutanol (85%) are charged to a stirred vessel, and 7.5 parts of formic acid (98% strength) are added. 2.8 parts of the ammonium salt of a sulfuric monoester of the formula (I) are added to this mixture and dissolved. In this formula (I) $R^1$ is an alkyl radical based on a synthetic fatty acid of 12 to 14 carbon atoms, n is 0 and $M^+$ is an ammonium ion in which $R^3$ is a hydrogen atom and $R^4$, $R^5$ and $R^6$ are each a hydroxy ethyl group (NW 115 s). Then 150 parts of the prepigment of C.I. Pigment Violet 23, prepared in accordance with DE-A-2 742 575, Example 2 or U.S. Pat. No. 4,253,839 Example 2, containing 25% of synthesis salt, predominantly sodium chloride, are introduced, and the mixture is stirred at from 20° to 25° C. for 20 hours. During this period a further 150 parts of isobutanol (85%) are added. Then 900 parts of water are added, the mixture is heated at boiling for 5 hours, and the isobutanol is distilled off azeotropically by heating to 100° C. at the bridge. After cooling to 60° C., the pigment is filtered off with suction, washed with water until neutral and free of salt, and dried at 80° C.

111.0 parts are obtained of a pigment preparation which gives transparent coatings of high color strength in the AM lacquer. In nitrocellulose intaglio printing and in offset printing, glossy prints of high color strength are obtained.

EXAMPLE 5

225 parts of isobutanol (85%) are charged to a stirred vessel, and 7.5 parts of formic acid (98% strength) are added. 4.0 parts of an aqueous paste of the sodium salt of a sulfuric monoester (active substance content 70%) of the formula (I) are added to this mixture and dissolved. In this formula (I) $R^1$ is a synthetic alkyl radical of 12 to 14 carbon atoms, n is 3 and $M^+$ is a sodium ion (NW 75 s). Then 150 parts of the prepigment of C.I. Pigment Violet 23, prepared in accordance with DE-A-2 742 575, Example 2 or U.S. Pat. No. 4,253,839 Example 2, containing 25% of synthesis salt, predominantly sodium chloride, are introduced, and the mixture is stirred at from 20° to 25° C. for 20 hours. During this period a further 150 parts of isobutanol (85%) are added. Then 900 parts of water are added, the mixture is heated at boiling for 5 hours, and the isobutanol is distilled off azeotropically by heating to 100° C. at the bridge. After cooling to 60° C., the pigment is filtered off with suction, washed with water until neutral and free of salt, and dried at 80° C.

111.9 parts are obtained of a pigment preparation which gives transparent coatings of high color strength in the AM lacquer. The rheology is assessed as 5. The viscosity is 5.5 s and the gloss measurement results in a value of 84. In the NC print, transparent prints of high color strength and high gloss are obtained.

EXAMPLE 6

A suspension consisting of 250 parts of water, 2.4 parts of sodium hydroxide (98% strength) and 30 parts of crude pigment of C.I. Pigment Violet 23 (salt-free) is metered at 1000 parts per hour into a ball mill with the configuration described in DE-C 3 716 587 which is filled with 35.5 parts of zirconium mixed-oxide beads with a diameter of 0.3–0.4 mm as grinding media, and the charge is milled at a peripheral stirrer speed of 15.6 m/s and with a specific power density of 3.1 kW per liter of milling space in circulation for 6 hours at from 50° to 55° C. The millbase suspension is then adjusted to a pH of from 3 to 4 by addition of 3.5 parts of formic acid (98% strength). Then 90 parts of isobutanol (100%) are metered in, and 2.68 parts of an aqueous solution of the sodium salt of a sulfuric monoester (active substance content 28%) of the formula (I) are added and dissolved. In this formula (I) $R^1$ is a synthetic alkyl radical of 12 to 14 carbon atoms, n is 3 and $M^+$ is a sodium ion (NW 75 s). The mixture is stirred at boiling temperature for 5 hours and then the isobutanol is distilled off azeotropically by heating to 100° C. at the bridge. After cooling to 60° C., a suspension of 150 parts of water and 6.9 parts of pigment dispersant of the formula (VI) is added as a 21.7% pure water-moist filter cake. In this formula (VI) P is the molecular structure of C.I. Pigment Violet 23 and X is the group of the formula (VII) in which A is the imidazolyl radical, $R^7$ is a methyl group, $R^8$ and $R^9$ are each a hydrogen atom and m is 1 (this pigment dispersant also contains about 50% of unsubstituted C.I. Pigment Violet 23). The mixture is stirred at 60° C. for 1 hour. The pigment preparation is subsequently filtered off with suction, washed with water until neutral and free of salt, and dried at 80° C. 32.5 parts are obtained of a pigment preparation which gives high-gloss prints of high color strength in the NC print. The viscosity, and the amount solvent consumed in the formulation of the print-ready ink, are very low.

EXAMPLE 7

A stirred vessel is charged with 600 parts of isobutanol (85%), and 20 parts of formic acid (98% strength) are added. Then 400 parts of the prepigment of C.I. Pigment Violet 23, prepared in accordance with DE-A-2 742 575, Example 2 or U.S. Pat. No. 4,253,839 Example 2, which contains 25% of synthesis salt, predominantly sodium chloride, are introduced, and the mixture is stirred at from 20° to 25° C. for 20 hours. During this period a further 400 parts of isobutanol (85%) are added. Then 2400 parts of water are added, the mixture is heated at boiling for 5 hours, and the isobutanol is distilled off azeotropically by heating to 100° C. at the bridge. After cooling to 60° C., 10.7 parts of an aqueous solution of the sodium salt of a sulfuric monoester (active substance content 28%) of the formula (I) are added.

In this formula (I) $R^1$ is a synthetic alkyl radical of 12 to 14 carbon atoms, n is 3 and $M^+$ is a sodium ion (NW 75 s). The mixture is stirred at 60° C. for 1 hour and then the pigment is filtered off with suction, washed with water until neutral and free of salt, and dried at 80° C.

239 parts are obtained of a pigment preparation which gives transparent coatings of high color strength in the AM lacquer. The rheology is assessed as 5. The viscosity is 5.1 s and the gloss measurement results in a value of 81. The pigment can be incorporated readily into aqueous and into nonaqueous preparations. These preparations possess very good coloristic and rheological properties.

EXAMPLE 8

A stirred vessel is charged with 100 parts of isobutanol (85%), and 3.5 parts of formic acid (98% strength) are added. Then 66.7 parts of the prepigment of C.I. Pigment Violet 23, prepared in accordance with DE-A-2 742 575, Example 2 or U.S. Pat. No. 4,253,839 Example 2, which contains 25% of synthesis salt, predominantly sodium chloride, are introduced, and the mixture is stirred at from 20° to 25° C. for 20 hours. During this period a further 66.7 parts of isobutanol (85%) are added. Then 400 parts of water are added, the mixture is heated at boiling for 5 hours, and the isobutanol is distilled off azeotropically by heating to 100° C. at the bridge. After cooling to 60° C., 1.8 parts of an aqueous solution of the sodium salt of a sulfuric monoester (active substance content 28%) of the formula (I) are added. In this formula (I) $R^1$ is a synthetic alkyl radical of 12 to 14 carbon atoms, n is 3 and $M^+$ is a sodium ion (NW 75 s). Then the pH is adjusted to 6–7 by addition of 7.0 parts of 10% strength sodium hydroxide solution, the mixture is stirred at 60° C. for 1 hour and then the pigment is filtered off with suction, washed with water until neutral and free of salt, and dried at 80° C.

49.0 parts are obtained of a pigment preparation which gives transparent coatings of high color strength in the AM lacquer. The rheology is assessed as 5. The viscosity is 4.9 s and the gloss measurement results in a value of 83. Transparent coatings of high color strength are obtained in the PE lacquer. The viscosity is 2.6 s and the rheology is assessed as 3. Transparent coatings of high color strength are obtained in the PU lacquer. The viscosity is 7.9 s and the rheology is assessed as 3.

EXAMPLE 9

A stirred vessel is charged with 270 parts of isobutanol (85%), and 9.0 parts of formic acid (98% strength) are added. Then 180 parts of the prepigment of C.I. Pigment Violet 23, prepared in accordance with DE-A-2 742 575, Example 2 or U.S. Pat. No. 4,253,839 Example 2, which contains 25% of synthesis salt, predominantly sodium chloride, are introduced, and the mixture is stirred at from 20° to 25° C. for 20 hours. During this period a further 180 parts of isobutanol (85%) are added. Then 1080 parts of water are added, the mixture is heated at boiling for 3 hours, and the isobutanol is distilled off azeotropically by heating to 100° C. at the bridge. After cooling to 60° C., 2.4 parts of an aqueous solution of the sodium salt of a sulfuric monoester (active substance content 28%) of the formula (I) are added. In this formula (I) $R^1$ is a synthetic alkyl radical of 12 to 14 carbon atoms, n is 3 and $M^+$ is a sodium ion (NW 75 s). The mixture is stirred at 60° C. for 1 hour and then the pigment is filtered off with suction, washed with water until neutral and free of salt, and dried at 80° C.

131.2 parts are obtained of a pigment preparation which gives transparent colorations of high color strength in PVC. The dispersibility and the fastness to bleeding are good.

EXAMPLE 10

A stirred vessel is charged with a suspension of 370.4 parts of 10% strength sodium hydroxide solution, 36.5 parts of ethanol and 33.8 parts of pigment (C.I. Pigment Violet 19, β-phase) prepared in accordance with DE-A-1 150 046, and the suspension is heated to boiling and stirred at boiling temperature for 2 hours. It is then cooled to 60° C., and, in succession, 2.93 parts of an aqueous solution of the sodium salt of a sulfuric monoester (active substance content 28%) of the formula (I) in which $R^1$ is a synthetic alkyl radical of 12 to 14 carbon atoms, n is 3 and $M^+$ is a sodium ion (NW 75 s) and 1.69 parts of pigment dispersant of the formula (VI) in which P is the quinacridone radical, X is the group (VIII) in which $R^{10}$ is a hydrogen atom and $R^{11}$ and $R^{12}$ are each a methyl group, p is 3 and o is 2, are added to this suspension. The mixture is stirred at 60° C. for 1 hour and filtered with suction, and the solid product is washed with water until neutral and free of salt, and dried at 80° C.

36.3 parts are obtained of a pigment preparation which gives transparent coatings of high color strength in the AM lacquer. The viscosity is 2.9 s and the rheology is assessed as 5. The gloss is 81.

EXAMPLE 11

A stirred vessel is charged with 600 parts of water, and 50 parts of pigment (2,9-dimethylquinacridone) prepared in accordance with DE-C 1 261 106, in the form of the moist filter cake, are introduced and suspended. The suspension is then heated to 60° C. and, at this temperature, 4.5 parts of an aqueous solution of the sodium salt of a sulfuric monoester (active substance content 28%) of the formula (I) are added. In this formula (I) $R^1$ is a synthetic alkyl radical of 12 to 14 carbon atoms, n is 3 and $M^+$ is a sodium ion (NW 75 s). The mixture is stirred at 60° C. for 2 hours, and then adjusted to a pH of 2 by addition of 7.6 parts of 10% strength hydrochloric acid, stirred for 1 hour at 60° C. and then filtered with suction, and the solid product is washed with water until neutral and free of salt, and is dried at 80° C. 49.9 parts are obtained of a pigment preparation which gives transparent coatings of high color strength in the AM lacquer.

EXAMPLE 12

A stirred vessel is charged with 375 parts of water, and 50 parts of pigment (C.I. Pigment Violet 19, y-phase) prepared in accordance with DE-C 1 184 881, in the form of the moist filter cake, are introduced and suspended. Then 4.5 parts of an aqueous solution of the sodium salt of a sulfuric monoester (active substance content 28%) of the formula (I) are added. In this formula (I) $R^1$ is a synthetic alkyl radical of 12 to 14 carbon atoms, n is 3 and $M^+$ is a sodium ion (NW 75 s). The mixture is stirred at 25° C. for 30 minutes and then adjusted to a pH of 2 by addition of 27 parts of 10% strength hydrochloric acid, is stirred at 25° C. for 1 hour and then filtered with suction, and the solid product is washed with water until neutral and free of salt, and is dried at 80° C.

51.3 parts are obtained of a pigment preparation which gives transparent coatings of high color strength in the AM lacquer. The viscosity is 4.5 s and the rheology is assessed as 5.

We claim:
1. A pigment preparation consisting essentially of
   a) a pigment from the class of quinacridones or dioxazines,
   b) one or more sulfuric monoesters of the formula (II)

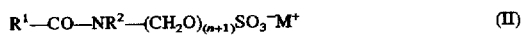

$$R^1-CO-NR^2-(CH_2O)_{(n+1)}SO_3^-M^+ \quad (II)$$

in which
- $R^1$ is a straight-chain or branched alkyl group of 10 to 24 carbon atoms,
- $R^2$ is a hydrogen atom or a $C_1$–$C_6$-alkyl group,
- $M^+$ is a hydrogen ion, an alkali metal ion, ½ an alkaline earth metal ion, or an ammonium ion of the formula $N^+R^3R^4R^5R^6$, where the substituents $R^3$, $R^4$, $R^5$ and $R^6$ independently of one another, are each hydrogen atoms or $C_1$–$C_6$-alkyl groups, which alkyl groups optionally are substituted by 1 to 3 hydroxyl groups, and
- n is a number from 0 to 4; and c) optionally a pigment dispersant of the formula (VI)

$$P\text{---}[X]_m \qquad (VI)$$

in which
- P is an m-valent radical of a pigment based on a quinacridone or dioxazine,
- m is a number from 1 to 4, and
- X is a group of the formula (VII)

$$\begin{array}{c} R^7 \\ | \\ -CH_2-A-R^8 \\ | \\ R^9 \end{array} \qquad (VII)$$

in which
- A is a five- or six-membered aromatic heterocycle which is optionally fused on, and which contains 1 to 3 identical or different heteroatoms selected from the group consisting of nitrogen, oxygen, sulfur, and a combination thereof, and the heterocycle is attached to the methylene group via a carbon atom,
- $R^7$ and $R^8$ independently of one another, are a hydrogen atom a $C_1$–$C_4$-alkyl, a $C_2$–$C_4$-alkenyl or an aryl group, or $R^7$ and $R^8$ together form an aliphatic or aromatic ring, and
- $R^9$ is a hydrogen atom or a $C_1$–$C_4$-alkyl, a $C_1$–$C_3$-hydroxyalkyl or a $C_2$–$C_4$-alkenyl group, or in which X is a group of the formula (VIII)

$$-SO_2-\left[\begin{array}{c} R^{10} \\ | \\ N-(CH_2)_p \end{array}\right]_o-N\begin{array}{c} R^{11} \\ R^{12} \end{array} \qquad (VIII)$$

in which
- $R^{11}$ and $R^{12}$ independently of one another are each a hydrogen atom, a $C_1$–$C_{20}$-alkyl, $C_2$–$C_{20}$-alkenyl group or a $C_5$–$C_7$-cycloalkyl group, or $R^{11}$ and $R^{12}$, together with the adjacent nitrogen atom, form an aliphatic or aromatic, five- or six-membered heterocyclic system having in each case from 1 to 3 identical or different heteroatoms which belong to the ring and are selected from the group consisting of nitrogen, oxygen, sulfur and a combination thereof,
- $R^{10}$ is a hydrogen atom or a $C_1$–$C_4$-alkyl group,
- p is a number from 1 to 6 and
- o is 1 or 2.

2. The pigment preparation as claimed in claim 1, wherein $R^1$ is an alkyl radical with 10 to 16 carbon atoms, $M^+$ is a sodium ion or hydrogen ion and n is a number from 2 to 3.

3. The pigment preparation as claimed in claim 1, wherein, in the pigment dispersant of the formula (VI), X is a group of the formula (VII), in which A is imidazolyl or indolyl.

4. The pigment preparation as claimed in claim 1, wherein, in the pigment dispersant of the formula (VI), X is a group of the formula (VIII), in which $R^{11}$ and $R^{12}$, together the adjacent nitrogen atom, form a morpholinyl or pyrrolidinyl ring.

5. The pigment preparation as claimed in claim 1, wherein the pigment is C.I. Pigment Violet 23, C.I. Pigment Violet 37, C.I. Pigment Violet 19, 2,9-dimethylquinacridone, 1,8-dichloroquinacridone, 2,9-dichloroquinacridone, 3,10-dichloroquinacridone or 2,9-di-N-methylcarboxamido-quinacridone.

6. A pigment preparation as claimed in claim 1, consisting essentially of
   a) from 90 to 99.9% by weight of a pigment from the class of quinacridones or dioxazines,
   b) from 0.1 to 5% by weight of one or more sulfuric monoesters of the formula (II), and
   c) from 0 to 9.9% by weight of a pigment dispersant of the formula (VI).

7. A pigment preparation as claimed in claim 1, consisting essentially of
   a) from 99.5 to 90% by weight of a pigment from the class of quinacridones or dioxazines,
   b) from 0.5 to 2.5% by weight of one or more sulfuric monoesters of the formula (II), and
   c) from 0.5 to 5% by weight of a pigment dispersant of the formula (VI).

8. A process for preparing a pigment preparation as claimed in claim 1, which comprises adding one or more sulfuric monoesters of the formula (II) in an amount of from 0.1 to 5% by weight, based on dry pigment, and from 0 to 9.9% by weight of a pigment dispersant of the formula (VI).

9. The process as claimed in claim 8, wherein the sulfuric monoesters are added directly before or after a finish operation.

10. The method of coloring a paint, printing ink or plastic comprising the step of incorporating a pigment preparation as claimed in claim 1 into said paint, printing ink or plastic.

11. The pigment as claimed in claim 1, further containing one or more sulfuric monoesters of the formula (I)

$$R^1\text{---}O\text{---}(CH_2O)_n\text{---}SO_3^-M^+ \qquad (I)$$

wherein $R^1$ and $M^+$ are defined in claim 1 and n is a number from 2 to 4.

12. A pigment preparation consisting essentially of
   a) a pigment from the class of quinacridones or dioxazines,
   b) one or more sulfuric monoesters of the formula (I)

$$R^1\text{---}O\text{---}(CH_2O)_n\text{---}SO_3^-M^+ \qquad (I)$$

in which
- $R^1$ is a straight-chain or branched alkyl group of 10 to 24 carbon atoms,
- $M^+$ is a hydrogen ion, an alkali metal ion, ½ an alkaline earth metal ion, or an ammonium ion of the formula $N^+R^3R^4R^5R^6$, where the substituents $R^3$, $R^4$, $R^5$ and $R^6$ independently of one another, are each hydrogen atoms or $C_1$–$C_6$-alkyl groups, which alkyl groups optionally are substituted by 1 to 3 hydroxyl groups, and
- n is a number from 2 to 4; and c) optionally a pigment dispersant of the formula (VI)

$$P\text{---}[X]_m \qquad (VI)$$

in which
- P is an m-valent radical of a pigment based on a quinacridone or dioxazine, m is a number from 1 to 4, and
X is a group of the formula (VII)

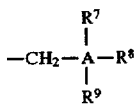

in which
- A is a five- or six-membered aromatic heterocycle which is optionally fused on, and which contains 1 to 3 identical or different heteroatoms selected from the group consisting of nitrogen, oxygen, sulfur, and a combination thereof, and the heterocycle is attached to the methylene group via a carbon atom,
- $R^7$ and $R^8$ independently of one another, are a hydrogen atom a $C_1$–$C_4$-alkyl, a $C_2$–$C_4$-alkenyl or an aryl group, or $R^7$ and $R^8$ together form an aliphatic or aromatic ring, and
- $R^9$ is a hydrogen atom or a $C_1$–$C_4$-alkyl, a $C_1$–$C_3$-hydroxyalkyl or a $C_2$–$C_4$-alkenyl group, or in which
X is a group of the formula (VII)

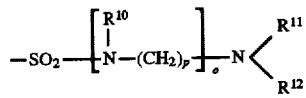

in which
- $R^{11}$ and $R^{12}$ independently of one another, are each a hydrogen atom, a $C_1$–$C_{20}$-alkyl, $C_2$–$C_{12}$-alkenyl group or a $C_5$–$C_7$-cycloalkyl group, or $R^{11}$ and $R^{12}$, together with the adjacent nitrogen atom, form an aliphatic or aromatic, five- or six-membered heterocyclic system having in each case from 1 to 3 identical or different heteroatoms which belong to the ring and are selected from the group consisting of nitrogen, oxygen, sulfur and a combination thereof,
- $R^{10}$ is a hydrogen atom or a $C_1$–$C_4$-alkyl group,
- p is a number from 1 to 6 and
- o is 1 or 2.

13. The pigment preparation as claimed in claim 12, wherein $R^1$ is an alkyl radical with 10 to 16 carbon atoms, $M^+$ is a sodium ion or hydrogen ion and n is a number from 2 to 3.

14. The pigment preparation as claimed in claim 12, wherein the pigment dispersant of the formula (VI), X is a group of the formula (VII), in which A is imidazolyl or indolyl.

15. The pigment preparation as claimed in claim 12, wherein the pigment dispersant of the formula (VI), X is a group of the formula (VIII), in which $R^{11}$ and $R^{12}$, together the adjacent nitrogen atom, form a morpholinyl or pyrrolidinyl ring.

16. The pigment preparation as claimed in claim 12, wherein the pigment is C.I. Pigment Violet 23, C.I. Pigment Violet 37, C.I. Pigment Violet 19, 2,9-dimethylquinacridone, 1,8-dichloroquinacridone, 2,9-dichloroquinacridone, 3,10-dichloroquinacridone or 2,9-di-N-methylcarboxamidoquinacridone.

17. A pigment preparation as claimed in claim 12, consisting essentially of
   a) from 90 to 99.9% by weight of a pigment from the class of quinacridones or dioxazines,
   b) from 0.1 to 5% by weight of one or more sulfuric monoesters of the formula (I) and
   c) from 0 to 9.9% by weight of a pigment dispersant of the formula (VI).

18. A pigment preparation as claimed in claim 12, consisting essentially of
   a) from 99.5 to 90% by weight of a pigment from the class of quinacridones or dioxazines,
   b) from 0.5 to 2.5% by weight of one or more sulfuric monoesters of the formula (I) and
   c) from 0.5 to 5% by weight of a pigment dispersant of the formula (VI).

19. A process for preparing a pigment preparation as claimed in claim 12, which comprises adding one or more sulfuric monoesters of the formula (I) in an amount of from 0.1 to 5% by weight, based on dry pigment, and from 0 to 9.9% by weight of a pigment dispersant of the formula (VI).

* * * * *